(12) United States Patent
Ennaifar et al.

(10) Patent No.: US 11,080,982 B1
(45) Date of Patent: Aug. 3, 2021

(54) LEAKAGE DETECTION AND LOCATION SYSTEM IN AN IRRIGATION NETWORK

(71) Applicant: International Business Machines Corporation, Armonk, NY (US)

(72) Inventors: Mustapha Ennaifar, Tunis (TN); Muhammad Ammar Ahmed, Karachi (PK); Moncef Benboubakeur, Brno (CZ); Julija Narodicka, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/931,545

(22) Filed: May 13, 2020

(30) Foreign Application Priority Data

Mar. 12, 2020 (PK) .................................. 169/2020

(51) Int. Cl.
| | |
|---|---|
| *G08B 21/00* | (2006.01) |
| *G08B 21/18* | (2006.01) |
| *G06N 5/04* | (2006.01) |
| *G06N 20/00* | (2019.01) |

(52) U.S. Cl.
CPC .............. *G08B 21/18* (2013.01); *G06N 5/04* (2013.01); *G06N 20/00* (2019.01)

(58) Field of Classification Search
CPC .................................................... G08B 21/18
USPC ............................ 340/605, 604, 608; 702/51
See application file for complete search history.

(56) References Cited

U.S. PATENT DOCUMENTS

| | | | |
|---|---|---|---|
| 5,708,195 A | 1/1998 | Kurisu et al. | |
| 6,351,985 B1 | 3/2002 | Bedwell | |
| 6,389,881 B1 * | 5/2002 | Yang | G01M 3/243 73/40.5 A |
| 6,453,247 B1 | 9/2002 | Hunaidi | |
| 2012/0285221 A1 | 11/2012 | Al-Qahtani et al. | |
| 2015/0355045 A1 * | 12/2015 | Solomon | F17D 5/02 702/36 |

(Continued)

FOREIGN PATENT DOCUMENTS

| | | |
|---|---|---|
| CN | 104948915 A | 9/2015 |
| WO | 2019016684 A2 | 1/2019 |

OTHER PUBLICATIONS

"Leak Detection System for Oil and Gas Pipelines," sensornet, Industries, printed Oct. 21, 2019, 3 pages. https://www.sensornet.co.uk/oil-and-gas-pipelines/.

(Continued)

*Primary Examiner* — Tai T Nguyen
(74) *Attorney, Agent, or Firm* — Nathan M. Rau (57) ABSTRACT

A system and method for determining a location of a leak within an irrigation network. The irrigation network is monitored for an indication that a leak has occurred, and then can evaluate the severity of the leak. At least one mobile sensing unit is selected to deploy across the irrigation network in response to the indication of a leak. Instructions are generated and sent to the at least one mobile sensing unit including information as to where in the irrigation network the at least one mobile sensing unit is to go. The mobile sensing unit is deployed into the irrigation network. A location of the leak within the irrigation network is determined based at least upon data gathered by the mobile sensing units while it is deployed in the irrigation network. An alert about the leak is sent in response to determining the location of the leak.

20 Claims, 5 Drawing Sheets

(56) References Cited

U.S. PATENT DOCUMENTS

| | | | |
|---|---|---|---|
| 2017/0115151 A1* | 4/2017 | Oh | ............................ E03B 7/072 |
| 2017/0172077 A1 | 6/2017 | Wouhaybi et al. | |
| 2017/0198854 A1 | 7/2017 | Gagliardo | |
| 2019/0187086 A1* | 6/2019 | Burkey | ................... G01D 21/02 |

OTHER PUBLICATIONS

"Water Leakage Management System," Water Environment Solutions, Hitachi, Printed Oct. 21, 2019, 4 pages. http://www.hitachi.com/businesses/infrastructure/product_site/water_environment/water_leakage/index.html.

"New system streamlines water leakage management," Technology, phys.org, Jun. 10, 2015, 3 pages. https://phys.org/news/2015-06-leakage.html.

"Integrated Leakage and Pressure Management System," Municipal, WaterWorld, Jul. 18, 2013, 5 pages. https://www.waterworld.com/municipal/urban-stormwater/stormwater-management/article/16201829/integrated-leakage-and-pressure-management-system.

Rashid et al., "WML: Wireless Sensor Network based Machine Learning for Leakage Detection and Size Estimation," The 6th International Conference on Emerging Ubiquitous Systems and Pervasive Networks (EUSPN 2015), Procedia Computer Science, 63, 2015, pp. 171-176.

"Satellite leak detection," SUEZ, Printed Oct. 21, 2019, 3 pages. https://www.suez.co.uk/en-gb/our-offering/businesses/what-are-you-looking-for/water-management/water-network-management/leak-detection/satellite-leak-detection.

Chandler, D., "A new way to detect leaks in pipes: Self-propelled robotic device can speed through pipes, pinpointing leaks more accurately than existing methods," MIT News, Jun. 19 20147, 3 pages. https://news.mit.edu/2014/new-robotic-system-detects-leaks-in-pipes-0619.

Tunes, S., "Water leak detection system uses machine learning," Agencia FAPESP, Apr. 4, 2018, 3 pages. http://agencia.fapesp.br/water-leak-detection-system-uses-machine-learning/27471/.

Loughran, J., Water leaks discovered with drones and camera sensing technology, E&T: Engineering and Technology, News, Mar. 20, 2018, 4 pages. https://eandt.theiet.org/content/articles/2018/03/water-leaks-discovered-with-drones-and-camera-sensing-technology.

Burger, S., "Prototype soil sampling device being tested for use in agriculture," Engineering News, Oct. 26, 2018, 4 pages, Creamer Media. http://m.engineeringnews.co.za/article/prototype-device-for-smart-agriculture-being-tested-2018-10-26/rep_id:4433.

"How modern agriculture technology and IoT data can improve harvests, sustainability, and quality," The Weather Company, an IBM Business, Weather Industries, Printed Oct. 21, 2019, 4 pages. https://www.ibm.com/weather/industries/agriculture.

Huang et al., "Airborne Remote Sensing for Detection of Irrigation Canal Leakage," Irrigation and Drainage, 2009, 11 pages, Wiley InterScience, DOI: 10.1002/ird.511.

Fahmy et al., "Detecting and locating leaks in Underground Water Mains Using Thermography," 26th International Symposium on Automation and Robotics in Construction (ISARC 2009), 2009, pp. 61-67. https://www.irbnet.de/daten/iconda/CIB14819.pdf.

Zhang, J., "Designing a Cost Effective and Reliable Pipeline Leak Detection System," Pipeline Reliability Conference, Nov. 1996, pp. 1-11. http://env1.kangwon.ac.kr/leakage/2010/knowledge/papers/management/reliability_96_paper.pdf.

Mell et al., "The NIST Definition of Cloud Computing", Recommendations of the National Institute of Standards and Technology, Special Publication 800-145, Sep. 2011, 7 pages.

Ennaifar et al, "Leakage Detection and Location System in an Irrigation Network," PK Application No. 16912020, Filed Mar. 12, 2020.

\* cited by examiner

LEAKAGE DETECTION AND LOCATION SYSTEM IN AN IRRIGATION NETWORK

BACKGROUND

The present disclosure relates to identifying leaks within an irrigation network, and more particular aspects relate to applying machine learning models to remote detection of the location of a leak in the irrigation network and optimize the time to locate a leak.

A drip irrigation system is a type of micro-irrigation system that allows water to drip slowly to the roots of plants, either from above the soil surface or buried below the surface. The goal of a drip irrigation system is to place water directly into the root zone and minimize evaporation. Drip irrigation systems distribute water through a network of valves, pipes, tubing, and emitters. Depending on how well designed, installed, maintained, and operated it is, a drip irrigation system can be more efficient than other types of irrigation systems, such as surface irrigation or sprinkler irrigation. However, these systems can develop leaks or other failures which can cause water wastage.

SUMMARY

According to embodiments of the present disclosure, a system for determining the presence and location of a leak in an irrigation network is disclosed. The system includes an irrigation network configured to provide a liquid to a crop in a field using one or more pipes. The system also has a leakage detector configured to determine that a leak has occurred within the irrigation network. Further, a data collector is configured to deploy across the irrigation network to collect data about a condition of the field in the irrigation network. A data analysis module is configured to receive data from the data collector, and to determine if the data indicates the presence of a leak at a particular location in the irrigation network. The system includes a control module that is configured to automatically deploy the data collector in response to a determination from the leakage detector that a leak has occurred.

According to embodiments a method for determining a location of a leak within an irrigation network is disclosed. The irrigation network is monitored for an indication that a leak has occurred, and then can evaluate the severity of the leak. At least one mobile sensing unit is selected to deploy across the irrigation network in response to the indication of a leak. Instructions are generated for the at least one mobile sensing unit including information as to where in the irrigation network the at least one mobile sensing unit is to go. These instructions are sent to the at least one mobile sensing unit. The mobile sensing unit is deployed into the irrigation network. A location of the leak within the irrigation network is determined based at least upon data gathered by the at least one mobile sensing unit while it is deployed in the irrigation network. An alert about the leak is sent in response to determining the location of the leak.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying leaks within an irrigation network, and more particular aspects apply machine learning models to the remote detection of the location of a leak in the irrigation network and to optimize the time to locate a leak. While the present disclosure is not necessarily limited to such applications, various aspects of the disclosure may be appreciated through a discussion of various examples using this context.

A drip irrigation system is a type of micro-irrigation system that allows water to drip slowly to the roots of plants, either from above the soil surface or buried below the surface. The goal of a drip irrigation system is to place water directly into the root zone and minimize evaporation. Drip irrigation systems distribute water through a network of valves, pipes, tubing, and emitters. Depending on how well designed, installed, maintained, and operated it is, a drip irrigation system can be more efficient than other types of irrigation systems, such as surface irrigation or sprinkler irrigation. Typically, an irrigation network is made in a tree. A primary network has the largest diameter of the pipe and distributes the largest flow of liquid in the irrigation network. A secondary network is derived from primary network, and usually has a lower diameter of pipe than the primary network and distributes a lower flow of liquid than the primary network. An irrigation network may have several sub-networks (primary, secondary, tertiary, etc.) depending on the topology of the field, its form and its dimensions.

Properly designed, installed, and managed, drip irrigation may help achieve water conservation by reducing evaporation and deep drainage when compared to other irrigation approaches such as flood or overhead sprinklers as water in a drip irrigation system can be more precisely applied to the plant roots. Further, drip irrigation can eliminate or reduce the occurrence of many diseases that are spread through water contact with the foliage. Finally, in regions where water supplies are severely limited, there may be no actual water savings, but rather simply an increase in production while using the same amount of water.

Figure 1:
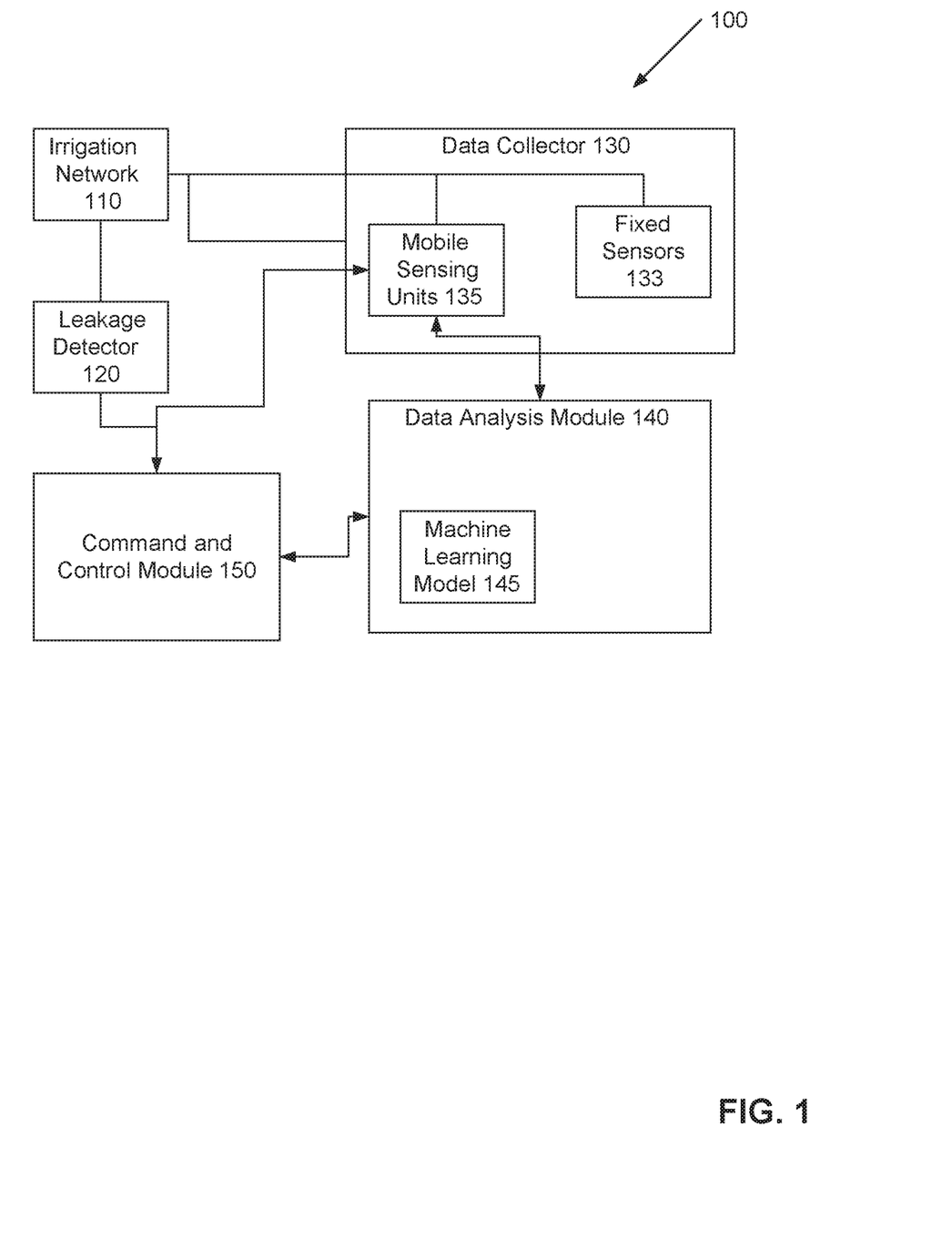
FIG. 1 is a block diagram illustrating components of a leakage detection system for an irrigation network according to illustrative embodiments.

Drip irrigation systems can develop leaks. When a leak occurs more water leaves the system causing waste and unused water resources as the water ends up in areas where it is not intended, or providing too much water to areas. When a leak occurs the farmer using the drip irrigation system has difficulty locating the source of the leak. They are aware of the leak but cannot easily locate it because the leak is either below the surface, not readily visible to the naked eye, or because of the size of the irrigation network the time for the farmer to physically check all of the lines is extremely time consuming. As such a way to quickly identify and locate a leak in the irrigation system is needed. The severity of the leak determines the urgency to fix it. The larger the leakage is the more liquid is wasted and the lower the quantity of the liquid distributed can be. As an Example: a very large leak has higher probability to happen in the Primary network than to happen on a Third or fourth sub-network due to the fact that a primary network has a higher pressure and drives a larger water flow FIG. 1 is a block diagram illustrating the components of irrigation system 100 according to embodiments of the present disclosure. System 100 includes an irrigation network 110, a leakage detector 120, a data collector 130, a data analysis module 140, and a command and control module 150.

The irrigation network 110 is a component of the system that provides water or other liquid to a field or other location through a network of pipes and valves. In some embodiments, the irrigation network 110 is a drip irrigation network 110. The pipes of the irrigation network 110 are either buried under the ground, or close to the roots of the crop, such that when a leak occurs in the network, the location of the leak is not readily visible to the naked eye. While the present disclosure discusses an irrigation network 110, it should be realized that the concepts herein can apply to any other underground network that carries liquids, such as a public water system, sewer system, pipeline, etc.

The leakage detector 120 is a component of the system that determines that a leak has occurred in the irrigation network 110. The leakage detector 120 monitors the irrigation network 110 for indicia of a leak. Indicia of a leak can include a change in the water pressure of the network, a change in the overall water flow in the network, or vibrations occurring in the pipes that form the network or a change in the sound generated by the water flow. When a leak occurs, the water pressure of the network typically goes down and the water flow typically goes up as more water is leaving the network than should be. In some embodiments, the irrigation network can be equipped with a pump feeding the network with the liquid. The pump can be equipped with a regulation system that adjusts the electrical power command of the pump in order to try to reach a specific liquid pressure in the pipe. In such a context, when a leak occurs, the water flow of the network typically goes up as the regulated pump attempts to keep the water pressure at a normal rate due to the extra amount of water leaving the network. As additional water leaks out of the pipes, additional vibrations and/or change in the sound can occur on account of the water interaction with the pipes as the water flows out of the pipe. Moreover, the leakage detector 120, once it determines that a leak has occurred, can evaluate the severity of the leak. This information can help optimize the time to determine of the location of the leak.

The data collector 130 is a component of the system that collects data from the irrigation network 110. The data collector 130 can include fixed sensors 133 as well as mobile sensing units 135. The fixed sensors 133 and the mobile sensing units 135 collect data about the field where the irrigation network 110 is deployed. The fixed sensors 133 can collect information such as water pressure, flow rate, vibrations in the piping, and the like. Further, depending on the location of the fixed sensors 133 can collect additional data about the field, such as moisture levels in the ground, chemical composition of the soil, the sound or noise of the system, and the like.

The mobile sensing units 135 are deployable by the system to make additional measurements across the irrigation network 110. The mobile sensing units 135 can include both robotic land based devices and/or unmanned aerial vehicles. Each mobile sensing unit has at least one type of sensor onboard. These sensors can include a camera, a thermal sensor, an acoustic sensor, probes for determining the moisture content of the soil, etc. However, the mobile sensing units 135 can have more than one sensor onboard, and these sensors can be combined into a single sensor. The mobile sensing units 135 operate in two different modes. The first mode is a baseline detection mode. This mode allows the system to gather baseline data about the irrigation network 110. In the first mode the mobile sensing units 135 move over the irrigation network 110 and collect the corresponding data about the ground. The first mode is performed when there is no leakage present in the irrigation network 110. This mode allows for the system to learn the normal state of the irrigation network 110. The mobile sensing units 135 are dispatched from a storage location or locations across the irrigation network 110. The mobile sensing units 135 can go over the terrain in a pattern such as a grid, or can be assigned to monitor a particular area of the irrigation network 110. The second mode is a leakage response mode. When a leak is detected by the leak detector 120 in the irrigation network 110, some or all of the mobile sensing units 135 are dispatched in the field to search for the location of the leak. The mobile sensing units 135 then monitor the area of the irrigation network 110 and provide information based on their sensors to the data analysis module 140.

The data analysis module 140 is a component of the system that analyzes data received from the data collector 130 to determine if the mobile sensing units 135 have identified a leak. The data analysis module 140 collects historical data from each of the mobile sensing units 135 and uses this information to determine the presence of a leak. The data analysis module 140 also employs a machine learning model 145 to assist in the determination of the location of the leak. The inputs from the various sensors are passed through the machine learning module to determine if the data indicates a leakage and the confidence in which the model believes its conclusion to be accurate. This analysis can be done on a mobile sensing unit basis or on a geo-coordinate basis of the irrigation network 110.

The machine learning model 145 is a component of the data analysis module 140 that is configured to output information about a leakage based on learned information about the network, in accordance with embodiments of the present disclosure. The machine learning model 145 is trained using historical data collected by the mobile sensing units 135. The training data includes data that indicates a leak, and data that indicates normal operation. The machine learning model 145 can employ various machine learning techniques to determine the normal state of the irrigation network 110. Through the machine learning process the data analysis module 140 can determine when a leak is present in a particular location of the network. Specifically, the machine learning process allows the data analysis module 140 to determine the accuracy of the data received from the mobile sensing units 135 and determine whether, based on the machine leaning information from the data, to send additional mobile sensing units 135 to the suspected site, or to keep searching for additional leaks in the network. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The command and control module 150 ("control module 150") is a component of the system that manages the overall operation of the system. The control module 150 obtains data from the leakage detector 120, the data collector 130, the mobile sensing units 135, and the data analysis module 140. The control module 150 also can create a plan of action for the mobile sensing devices based on the data received from the various data devices. This plan of action can include generating a series of waypoints for each mobile sensing unit 135 to follow. The waypoints are locations within the irrigation network where the mobile sensing unit will go to and record data with its sensors. The mobile sensing unit 135 will move from waypoint to waypoint according to the plan. When a leakage is detected by the leakage detection system 120, the control module 150 determines when and where to send out the mobile sensing devices to look for the leak. As discussed above the mobile sensing units 135 will go out into the field and scan the irrigation network 110 for various kinds of data according to the plan. This data is reported back to the control module 150 and also to the data analysis module 140. The control module 150 receives from the data analysis module 140 an indication of where the data analysis module 140, based on the machine learning model 145, believes that the leak is located. With this information the control module 150 can determine when to send out an alert to the manager of the network indicating to them that there is a leak in the network and where in the network the leak is believed to be.

Figure 2:
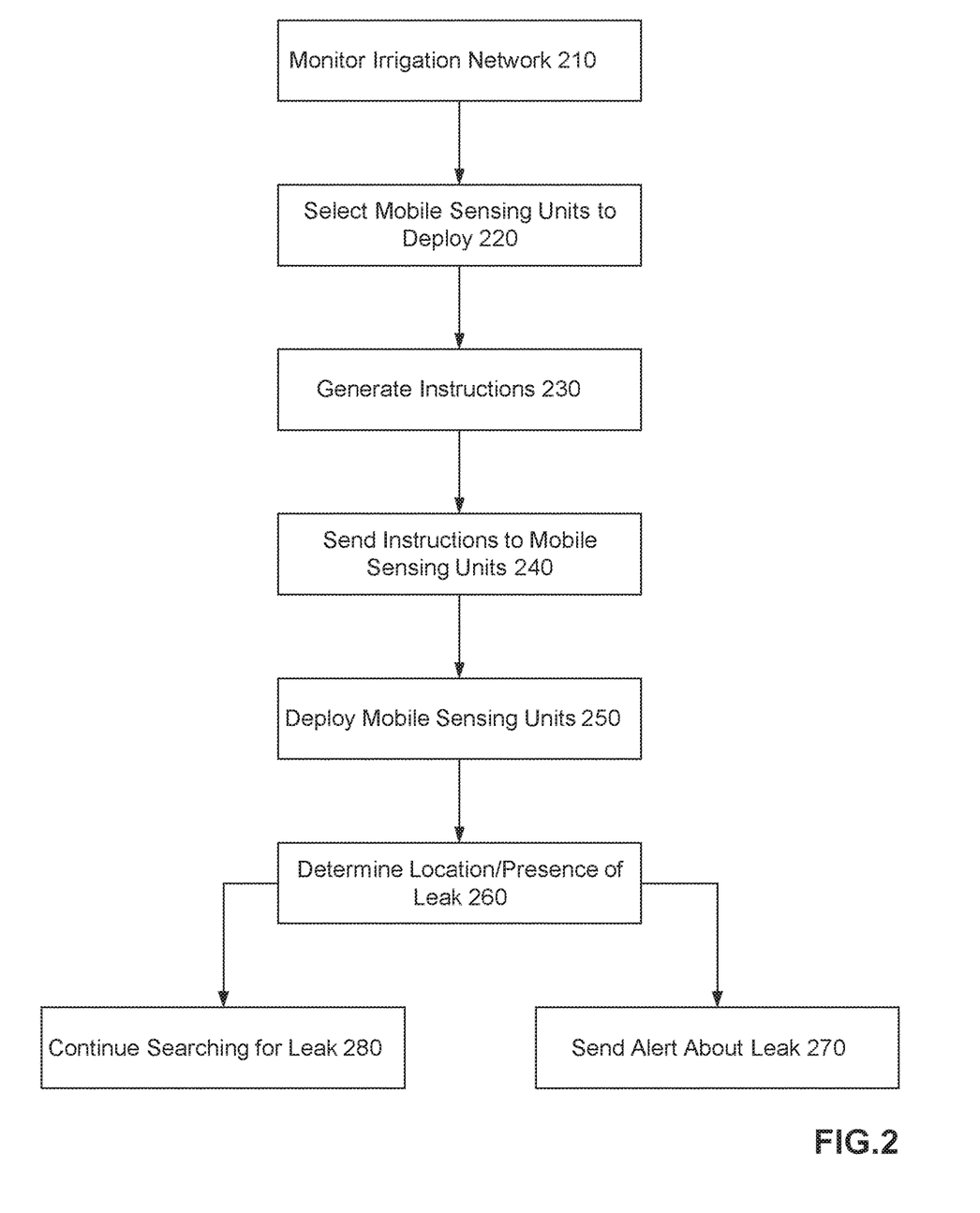
FIG. 2 is a flow diagram illustrating a process for determining the location of a leak in the irrigation network.

FIG. 2 is a flow diagram illustrating a process for determining the location of a leak in the irrigation network 110, according to illustrative embodiments.

The process begins by monitoring data associated with the operation of the irrigation network 110. This is illustrated at step 210. This data can include measured water pressure in the irrigation network 110, the rate of water flow in the irrigation network 110, vibrations in the irrigation network 110, the sound (or noise) generated by the irrigation network 110 or any other data that is measurable and would change as the result of a leak in the irrigation network 110. This monitoring of the irrigation network 110 can be done on a continuous basis. However, in some embodiments it can be done on a periodic basis. Periodic monitoring can be implemented to save resources in areas where energy or other resources are in limited supply, or where portions of the irrigation system 100 are shared between multiple farms. This period can be every few hours, daily, weekly, or any other period selected by the administrator. The monitored data is monitored for an indication of a leak in the irrigation network 110. A leak is determined to be present when the monitored data exceeds a threshold value associated with the monitored data. Depending on the data that is being monitored exceeding the threshold value can mean falling above or below the threshold value. For example, a bottom threshold value for water pressure can be used such that when the water pressure falls below the threshold value a leak is inferred. In contrast, a top threshold for water flow can be used, such as when the water flow exceeds the threshold value a leak is inferred. As the irrigation network 110 can be quite large and complex, the data reported at different areas of the irrigation network 110 can be different, with one area indicating a leak is present, while another area is not indication the presence of a leak. Further, based on the monitored data the type of leakage can be determined. For example, a small leak or crack in a pipe may not cause as great of a decrease in water pressure as a large leak would. The control module 150 can employ multiple thresholds to help determine the type or severity of the leak.

If the monitored data associated with the irrigation network 110 indicates a leak is present, the process proceeds to identify the available mobile sensing units 135 and selects the units to deploy. This is illustrated at step 220. As each mobile sensing unit has at least one type of sensor onboard the control module 150 identifies which of the mobile sensing units 135 are best suited for dispatch to the area where the leak is believed to be located. The control module 150 can employ data from the embedded sensors in the irrigation network 110 to assist in the determination as to which of the mobile sensing units 135 to deploy to the area. For example, if there are a number of embedded moisture sensors in the area, the control module 150 can determine that sending a unit with ground moisture sensors may be redundant. As such, the control module 150 can select units that have other sensing capabilities to deploy to that location.

Once the mobile sensing units 135 have been selected by the control module 150, the control module 150 generates instructions for the mobile sensing units 135. This is illustrated at step 230. The control module 150 receives a map of the irrigation network 110 with coordinates or other markings. This map can include information on the location of the embedded sensors, and obstacles that are present in the irrigation network 110. The control module 150 then overlays on the map a series of waypoints. These waypoints are points on the map where the mobile sensing units 135 are expected to go to and monitor the irrigation network 110. The mobile sensing units 135 will move from waypoint to waypoint according to the instructions provided by the control module 150. The control module 150 can divide the waypoints between different ones of the mobile sensing units 135 so that each unit is more efficiently covering the area. In determining where to place the waypoints, the control module 150 considers the historical data from the irrigation network 110. This data can include areas where leaks have frequently appeared before, data about leakages that share common characteristics to the currently observed situation, and/or the particular type and severity of leakage that is believed to be currently present. For example, when a large leak is detected (e.g. from water flow well beyond a threshold value) the control module 150 can prioritize areas around the primary network of pipes. In another example, when a small leak is detected and a history associated with the system indicates that this type of leak consistently occurs with a particular part in the irrigation network 110, the control module can prioritize those locations where that particular component is located within the network 110.

Following the generation of instructions for each of the mobile sensing units 135, the control module 150 sends the instructions to the mobile sensing units 135. This is illustrated at step 240. Each mobile sensing unit receives its instructions form the control module 150. The instructions can be sent to the units all at once, or can be sent to them over a period of time.

Each of the mobile sensing units 135 proceeds to follow the instructions and monitors the irrigation network 110. This is illustrated at step 250. The unit proceeds to follow the assigned waypoints. At each waypoint, the unit captures data from its sensors. However, in some embodiments the unit can scan constantly even as it is moving between waypoints. This data is then sent to the data analysis module 140 for analysis. The data analysis module 140 applies the machine learning model 145 to the data and based on this model determines whether the data indicates a leak is present or not at that particular location. The model also determines a confidence level in its determination that a leak is present or not. If the model determines a leak is present this information is relayed to the control module 150 along with the location. In some embodiments, when a leak is determined the unit can interrupt the instructions from the control module 150 and return to the waypoint where the leak was detected and perform a more detailed or deeper scan of the area using the available sensors.

The control module 150 receives from the mobile sensing units 135 information regarding the irrigation network 110. This is illustrated at step 260. The control module 150 extracts the data received from each on the mobile sensing units 135 and identifies those mobile sensing units 135 that indicated a leak was present in the irrigation network 110. This information can come to the control module 150 either directly from the unit or can come from the data analysis module 140 when the unit sends the data for analysis. To identify the location of the leak the control module 150 can consider the particular data that the particular unit generated and the accuracy of that data. The control module 150 then uses location data from those mobile sensing units 135 to determine the location of the leak. The control module 150 can in some embodiments determine that additional confirmation of the leak is required. This could be because the confidence of the data from the unit did not meet a particular threshold, there is conflicting data between multiple different units, or any other reason. When additional confirmation is needed the control module 150 proceeds to identify one or more mobile sensing units 135 who can provide the secondary confirmation of the leak. Again this selection process is similar to the selection process at step 220. The control module 150 then sends the updated plan to the selected units to go to the location of the believed leak. This updated plan can cause the particular unit to interrupt its current monitoring to respond to the updated request from the control module 150.

If there is confirmation of a leak either through the second confirmation or the original detection, the control module 150 issues an alert to the user. This is illustrated at step 270. This alert can include information gathered by the mobile sensing units 135 about the leak. For example, the alert can include the location of the leak along with data such as photographs of the area, moisture readings, thermal scans, etc. This allows the user of the irrigation network 110 to see the impact of the leak and prepare to respond to the leak accordingly. In some embodiments the alert is sent when the confidence level determined by the machine learning model 145 exceeds a threshold level of confidence.

If the leak is not confirmed by the additional confirmation the control module 150 instructs the mobile sensing units 135 to continue searching. This is illustrated at step 280.

Figure 3:
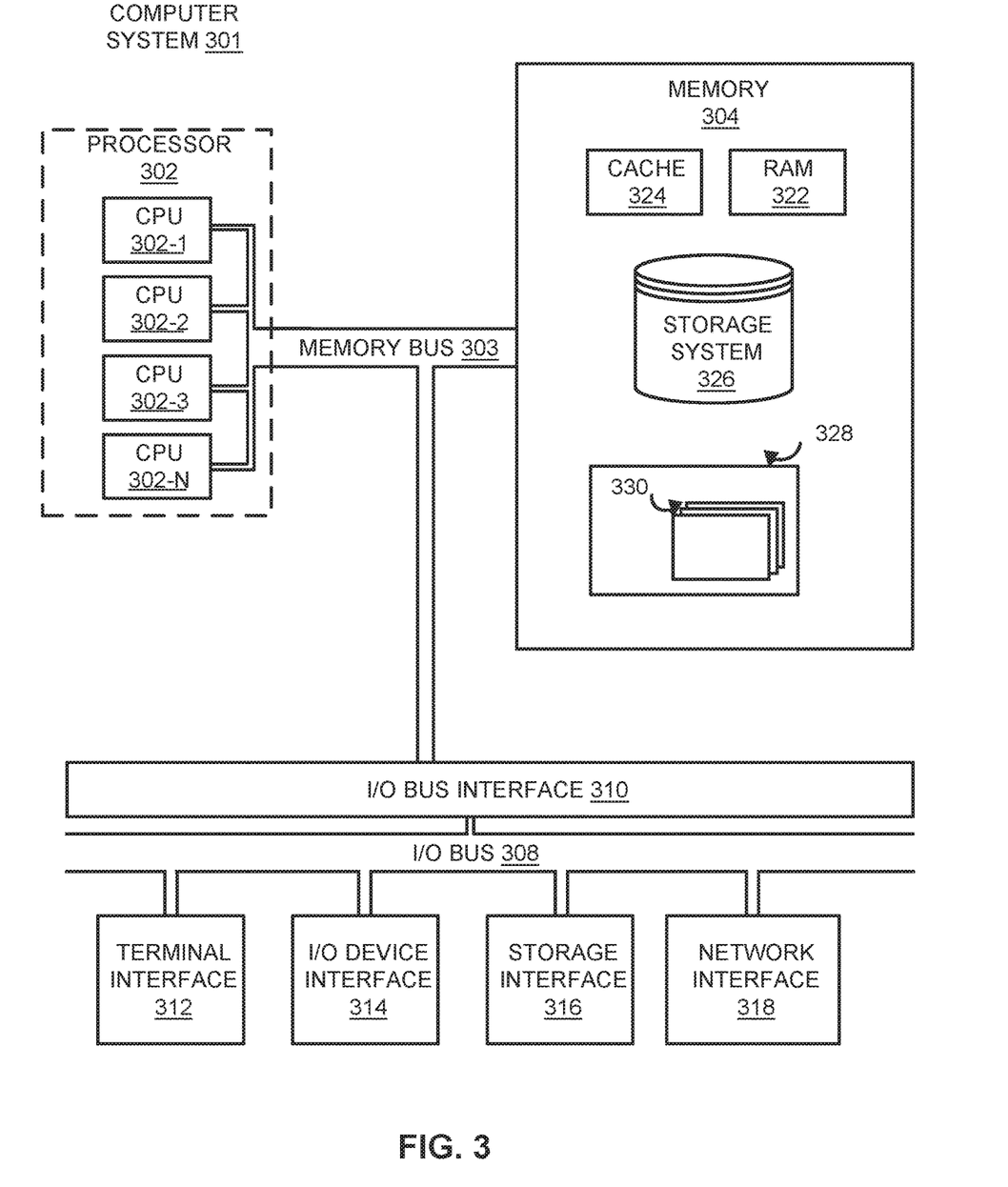
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302-1, 302-2, 3023, 302-N, herein collectively referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
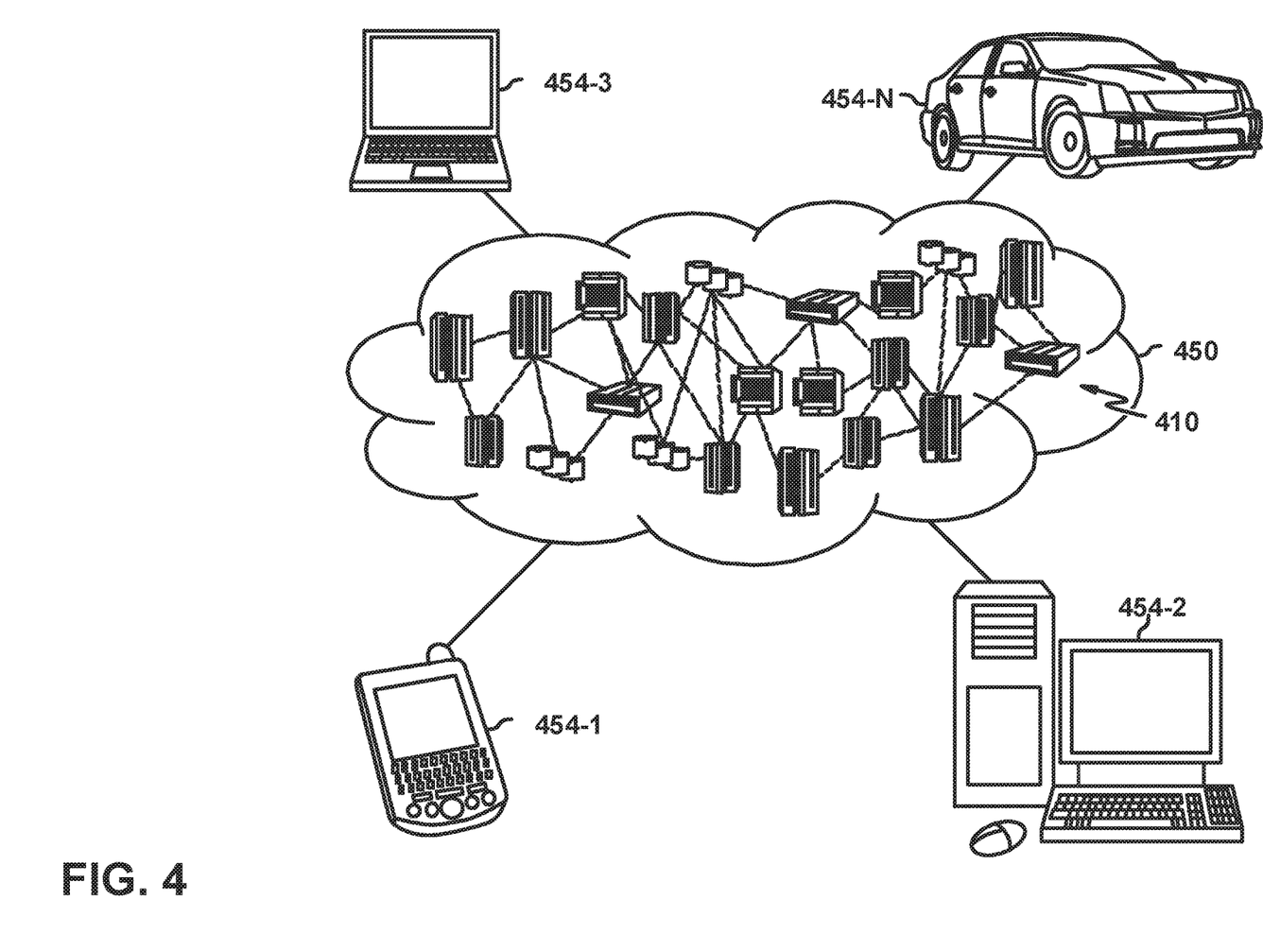
FIG. 4 is a diagrammatic representation of an illustrative cloud computing environment.

The system 100 may be employed in a cloud computing environment. FIG. 4 is a diagrammatic representation of an illustrative cloud computing environment 450 according to one embodiment. As shown, cloud computing environment 450 comprises one or more cloud computing nodes 410 with which local computing devices used by cloud consumers, such as, for example, personal digital assistant (PDA) or cellular telephone 454-1, desktop computer 454-2, laptop computer 454-3, and/or automobile computer system 454-N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454-1, 454-2, 454-3, . . . 454-N shown in FIG. 4 are intended to be illustrative only and that computing nodes 5 and cloud computing environment 450 may communicate with any type of computerized device over any type of network and/or network addressable connection (e.g., using a web browser).

Figure 5:
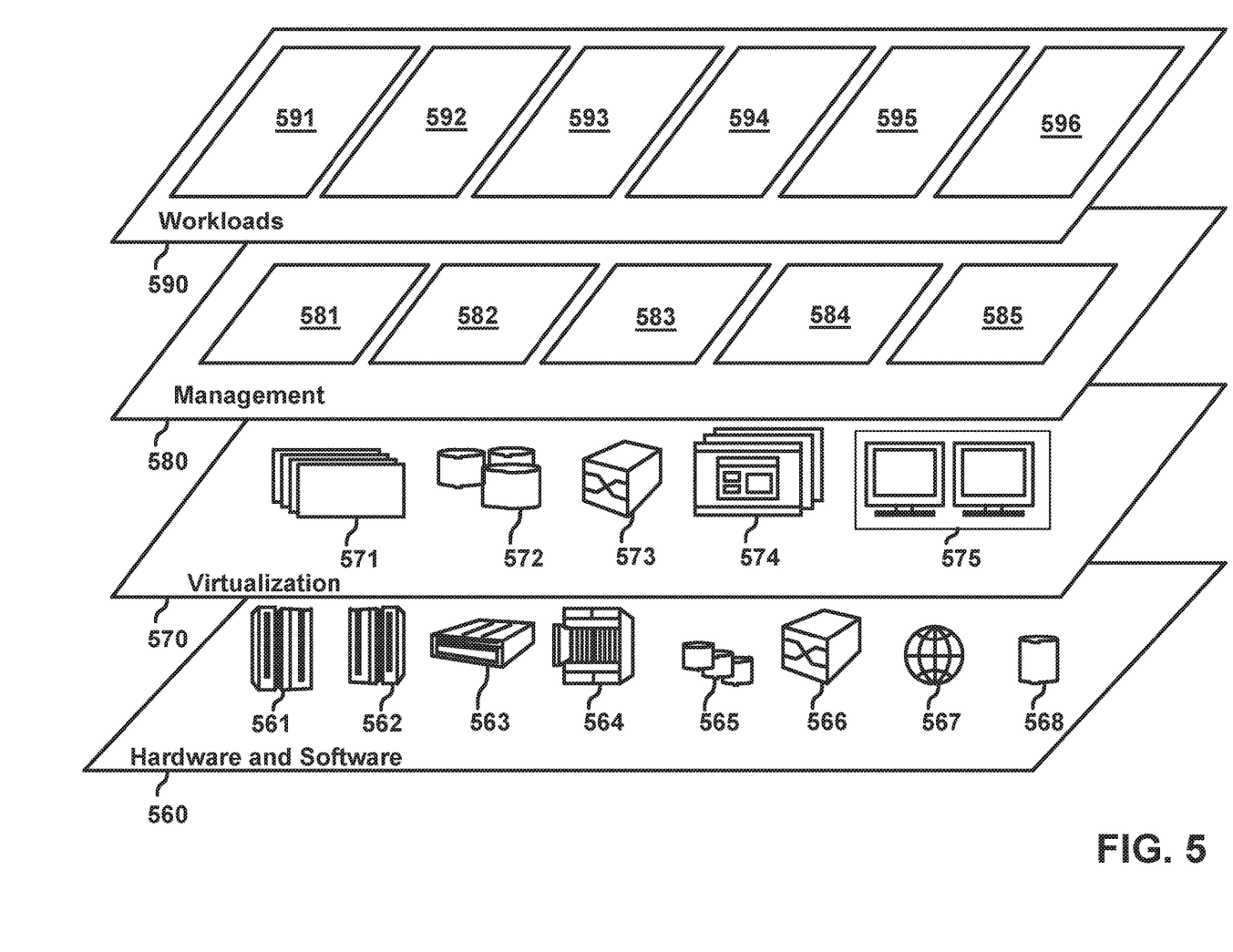
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; layout detection 593; data analytics processing 594; transaction processing 595; and database 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for determining a location of a leak, comprising:
    an irrigation network, the irrigation network configured to provide a liquid to a crop in a field using one or more pipes;
    a leakage detector configured to determine that a leak has occurred within the irrigation network;
    a data collector configured to deploy across the irrigation network to collect data about a condition of the field in the irrigation network;
    a data analysis module configured to receive data from the data collector and to determine if the data indicates a presence of a leak at a particular location in the irrigation network; and
    a control module configured to automatically deploy the data collector in response to a determination from the leakage detector that a leak has occurred.

2. The system of claim 1 wherein the data collector includes a plurality of mobile sensing units having at least one sensor that is configured to collect data about the condition of the field.

3. The system of claim 2 wherein the mobile sensing units are configured to operate in two modes, a first mode and a second mode;
    wherein when operating in the first mode the mobile sensing units collect data about the irrigation network when there is no leak present in the irrigation network and provide the data to the data analysis model for training; and
    wherein when operating in the second mode the mobile sensing units collect data about the irrigation network when there is a leak present in the irrigation network and provide the data to the data analysis model for analysis for the presence of a leak.

4. The system of claim 1 wherein the data analysis module further comprises:

a machine learning model configured to be trained by data collected by the data collector when no leak is present in the irrigation network;

wherein the machine learning model is further configured to receive from the data collector data related to the condition of the irrigation network and determine if the data indicates a leak is present and a confidence level of the leak.

5. The system of claim 1 wherein the control module is configured to generate a plan of action for each of the mobile sensing units, wherein in the plan of action includes a plurality of waypoints for the mobile sensing unit to deploy to within the irrigation network.

6. The system of claim 5 wherein the control module is further configured to interrupt the plan of action for one of the mobile sensing units in response to a detection of a leak by another one of the mobile sensing units.

7. The system of claim 6 wherein the control module is further configured to generate a new plan of action for the one of the mobile sensing units, wherein the new plan of action includes waypoints present in the plan of action for the another one of the mobile sensing units.

8. The system of claim 5 wherein the plan of action for each of the mobile sensing units is generated based upon a set of capabilities of each mobile sensing unit.

9. The system of claim 8 wherein the plan of action for each of the mobile sensing units is generated based upon a location of at least one fixed sensing device.

10. A method for determining a location of a leak within an irrigation network, comprising:
monitoring the irrigation network for an indication that a leak has occurred;
selecting at least one mobile sensing unit to deploy across the irrigation network in response to the indication of a leak;
generating instructions for the at least one mobile sensing unit, wherein the instructions include information as to where in the irrigation network the at least one sensing unit is to go;
sending the instructions to the at least one mobile sensing unit;
deploying the at least one mobile sensing unit into the irrigation network;
determining the location of the leak within the irrigation network based at least upon data gathered by the at least one mobile sensing unit while it is deployed in the irrigation network; and
sending an alert about the leak in response to determining the location of the leak.

11. The method of claim 10 wherein selecting at least one mobile sensing unit selects the mobile sensing unit based upon the at least one mobile sensing unit having a sensor different from an embedded sensor in the irrigation network.

12. The method of claim 10 further comprising:
transmitting the data gathered by the mobile sensing unit to a data analysis module; and
wherein the determining is performed by the data analysis module.

13. The method of claim 12 wherein the data analysis model applies a machine learning model to determine the presence of a leak at a location.

14. The method of claim 13 further comprising:
determining, by the machine learning model, a confidence level that a leak is present at the location; and
sending the alert when the confidence level exceeds a threshold level.

15. The method of claim 10 wherein determining the location of the leak further comprises:
determining whether additional confirmation of the leak is required.

16. The method of claim 15 wherein when additional confirmation of the leak is required, further comprising:
identifying a second mobile sensing unit to send to the location;
deploying the second mobile sensing unit to the location;
receiving a second set of data from the second sensing unit at the location; and
determining from the second set of data that a leak is present at the location.

17. The method of claim 16 further comprising:
interrupting a current set of instructions for the second mobile sensing unit; and
providing a new set of instructions to the second mobile sensing unit.

18. The method of claim 15 wherein determining whether additional confirmation of the leak is required further comprises:
determining a confidence level of the leak for the location based upon the data gathered by the at least one mobile sensing unit while it is deployed in the irrigation network; and
determining that additional confirmation is required when the confidence level is below a threshold level.

19. The method of claim 10 further comprising:
evaluating the severity of the leak.

20. A computer program product having computer executable instructions that when executed by at least one computing device cause the at least one computing device to determine a location of a leak within an irrigation network, the instructions comprising to:
monitor the irrigation network for an indication that a leak has occurred;
select at least one mobile sensing unit to deploy across the irrigation network in response to the indication of a leak;
generate instructions for the at least one mobile sensing unit, wherein the instructions include information as to where in the irrigation network the at least one sensing unit is to go;
send the instructions to the at least one mobile sensing unit;
deploy the at least one mobile sensing unit into the irrigation network;
determine the location of the leak within the irrigation network based at least upon data gathered by the at least one mobile sensing unit while it is deployed in the irrigation network; and
send an alert about the leak in response to determining the location of the leak.

* * * * *